(No Model.)

H. FEURHAKE & C. N. BRADY.
GLASS SIRUP CAN AND MOLD FOR MAKING THE SAME.

No. 256,663. Patented Apr. 18, 1882.

Witnesses:
F. M. Burnham.
H. R. Moulton.

Inventors
Henry Feurhake
Charles N. Brady
by F. W. Ritter Jr. atty

UNITED STATES PATENT OFFICE.

HENRY FEURHAKE AND CHARLES N. BRADY, OF WELLSBURG, W. VA.

GLASS SIRUP-CAN AND MOLD FOR MAKING THE SAME.

SPECIFICATION forming part of Letters Patent No. 256,663, dated April 18, 1882.

Application filed March 17, 1882. (No model.)

*To all whom it may concern:*

Be it known that we, HENRY FEURHAKE and CHARLES N. BRADY, citizens of the United States, residing at Wellsburg, in the county of Brooke and State of West Virginia, have invented certain new and useful Improvements in Glass Sirup-Cans and Molds for Making the Same; and we do hereby declare the following to be a full, clear, and exact description of the same, reference being had to the accompanying drawings, in which—

Figure 3:
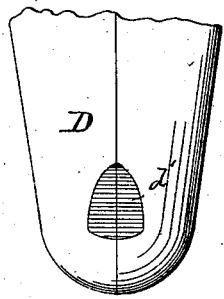
Figure 1:
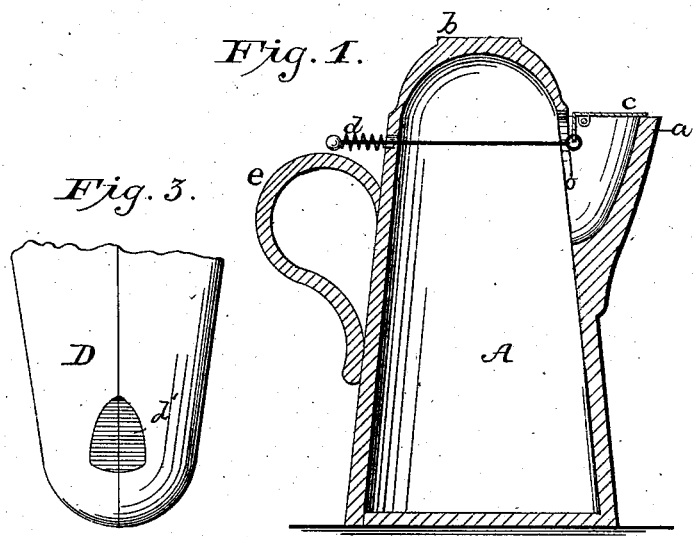
Figure 4:
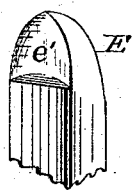
Figure 2:
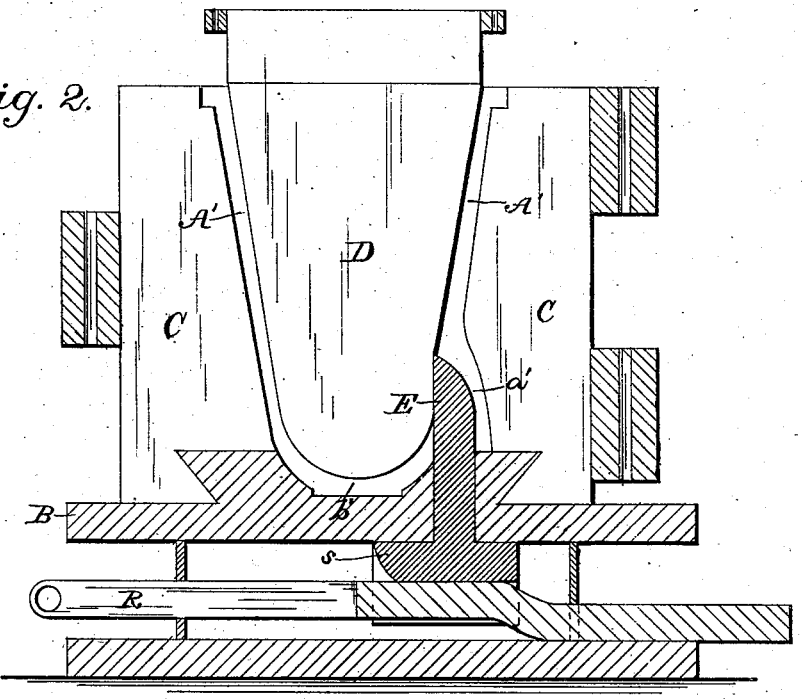

Figure 1 is a sectional view of a glass sirup-can embodying our invention. Fig. 2 is a sectional view of a mold which may be used in forming the same. Fig. 3 is a detail view of a portion of the main plunger; and Fig. 4 is a similar view of the bottom plunger or "punty," as it is sometimes termed.

Like letters refer to like parts wherever they occur.

In glass sirup-cans as heretofore constructed several forms have been adopted with the purpose of facilitating their production and lessening the cost of manufacture, as well as for the purpose of improving the general appearance—as, for instance, the can has been blown or pressed with a flaring lip or drip-cup, and a metallic pouring-lip and hinged cover have been subsequently applied, while in other instances the article has been pressed with drip-lip and pouring-spout integral with the body, and the metallic hinged cap or cover subsequently attached. In all cases, however, so far as we are aware, the cover has been formed of metal, which is objectionable on account of the first cost, and also because it is liable to become tarnished by use and derogate from the cleanliness and appearance of the article.

The object of the first part of our invention is therefore to dispense as far as possible with metallic attachments; and to this end it consists mainly in forming the cover or major portion thereof of glass, either integral with the body or permanently attached thereto, as will hereinafter more fully appear.

The second object is to improve the means of producing such articles; and this part of our invention relates to molds wherein the plungers pass each other so as to shear or cut the molten glass and form the opening between the body of the can and pouring-spout, and also permit the main plunger to form the closed top of the can.

The invention further consists in details of construction and specific combinations, which will be hereinafter more fully set forth.

We will now proceed to describe our invention more specifically, so that others skilled in the art to which it appertains may apply the same.

In the drawings, A indicates the body of a glass sirup-can embodying the first part of our invention. This can is preferably formed with a projecting pouring-spout, *a*, and is closed above, except at the spout, by a cover, *b*, of like material as the body of the can, the spout alone being closed, when deemed desirable, by a hinged metallic leaf, *c*, which may, if employed, either be counterbalanced so as to swing open upon the tilting of the can, or may be actuated by a spring thumb-rod, *d*, which projects above the handle *e*, as shown in Fig. 1.

In order to facilitate the filling and cleaning of the can, the opening at the spout *a* should be of ample size, and to obtain a sufficiently large opening, without encroaching upon the cover or needlessly exposing the interior of the can, it is desirable that the pouring-spout project or be formed on the side of the body A, substantially as shown at *a*.

The essential feature of this, the first part of our invention—viz., the closed cover *b*, of like material with the body—being provided for, the can may be formed in any of the various ways known to glass manufactures—as, for instance, the closed body A, with its cover *b*, may be blown in a separable or sectional mold, the blow-over being made at the opening of spout *a*, the lip of which can be subsequently fine-polished or otherwise smooth-finished; or the body A, with spout *a*, may be blown or pressed, and the cover *b*, being separately formed, may be subsequently secured in place when the metal is in condition to weld or unite; but as for such purposes pressed ware, being the most solid and serviceable, is the most desirable, and as it is also preferable to form the cover *b* integral with the body A, we have shown a mold for producing such articles, which mold embodies the second part of our invention, and may be described as follows:

B indicates the bottom or bed-plate, on which rests the sections C of a separable or hinged mold. To the matrix A' of this mold is given the general form (preferably tapering from above downward) of the article to be produced, and below or at the base the matrix flares, as at a', to form a spout upon the article formed therein. The opening for the thumb-rod d and indentations for attaching the metallic leaf c may be made by lugs or projections properly located within the matrix A', in manner well known to those skilled in the art. Where a dome-shaped top or cover, b, is preferred the bottom plate, B, may be hollowed out or made concave, as at b', and the end of the main plunger D correspondingly shaped.

D indicates the main plunger, or that which forms the body and top or cover of the article, and E the minor plunger, (sometimes termed "punty,") which shapes the spout or nose of the can. These two plungers project into the mold from opposite directions, and pass each other in such manner that when the opposed sides are slightly flattened, as at d', Fig. 3, and move in contact they will act as shears to cut the molten glass, and thus form the opening O, Fig. 1, between the body of the can and the spout a. The plunger or punty E projects through the bottom plate, B, and is attached to or formed on a saddle, s, arranged below the bottom plate, and whose under surface is an incline, said saddle resting upon a sliding cam-bar, R, which projects through the sides of the mold-bed, and may be forced in or drawn out to project or withdraw the plunger E.

We have before spoken of the contact of the plungers D and E, giving a shearing cut to form the opening o between the body of the can and spout; but sometimes it may be desirable in pressing the article to prevent the direct contact of the passing plungers, in which case a web or septum of glass would be formed in the article at the point o, which would have to be broken away after the article was removed from the mold. In such case, in order to facilitate the removal of this septum or web, we form the plunger E slightly concave, as at e', Fig. 4, and the septum is then pressed thinner at the edges than in the middle, so that it can be the more readily broken out, and will fracture regularly and evenly all around.

The devices for forming the article, being substantially such as above described, will be operated as follows: The plunger D being raised out of the mold and the plunger E projecting into the mold, as shown in Fig. 2, a sufficient quantity of molten glass is cut into the mold, and the plunger D, descending, will form the body A and cover b of the article at the same time, while the spout a is shaped by the plunger E, and the opening o between the spout and body of the can is made by the shear cut of the two plungers in passing, or if the plunger E has the concavity e', as shown in Fig. 4, a septum or web is left between the body of the can and spout, which can be subsequently broken away.

When the article is removed from the mold the bottom may be closed by means of a pressed bottom, the parts being brought together at a welding-heat, or it may be reheated and closed by hand in manner well known to those skilled in the art. In the latter case provision should be made therefor by increasing the length of the portion A when pressing the article.

Among the advantages of our invention are, first, that most of the metal which is liable to become tarnished and give an unsightly appearance to the article is dispensed with; secondly, the cost of manufacture is greatly reduced, the small metallic leaf used to close the spout costing less than one-fourth the cost of tops required as such cans are now constructed; thirdly, the article is more easily finished up; and, finally, it presents and retains a neat and cleanly appearance.

Having thus described our invention, what we claim, and desire to secure by Letters Patent, is—

1. A glass sirup-can having a closed top of like material and continuous with the body of the can, and a pouring-lip, substantially as and for the purpose specified.

2. A glass-sirup can having the cover b integral with the body of the can, and the projecting pouring-spout a, substantially as and for the purpose specified.

3. The combination, with the pivoted leaf spout-cover, of the thumb-rod for actuating the same, substantially as and for the purpose specified.

4. The combination, with a glass-mold, of two plungers arranged to pass each other within the matrix, substantially as and for the purpose specified.

5. The combination, with the mold, of a plunger flattened upon one side near its extremity and a plunger which is slightly concave upon one side near its extremity, said plungers arranged to enter the mold from different directions, so that the flattened side of one plunger shall present to the concave side of the other plunger, substantially as and for the purpose specified.

In testimony whereof we affix our signatures, in presence of two witnesses.

HENRY FEURHAKE.
CHARLES N. BRADY.

Witnesses:
F. W. RITTER, Jr.,
H. B. MOULTON,
GEORGE W. KING,
WHEELER REEVES.